US009250966B2

(12) United States Patent
Urbach

(10) Patent No.: US 9,250,966 B2
(45) Date of Patent: Feb. 2, 2016

(54) CROWD-SOURCED VIDEO RENDERING SYSTEM

(75) Inventor: Julian Michael Urbach, Sherman Oaks, CA (US)

(73) Assignee: OTOY, INC., Los Angeles, CA (US)

( * ) Notice: Subject to any disclaimer, the term of this patent is extended or adjusted under 35 U.S.C. 154(b) by 602 days.

(21) Appl. No.: 13/208,164

(22) Filed: Aug. 11, 2011

(65) Prior Publication Data

US 2013/0038618 A1 Feb. 14, 2013

(51) Int. Cl.
*G06T 1/00* (2006.01)
*G06F 15/00* (2006.01)
*G06F 9/50* (2006.01)
*G06T 15/50* (2011.01)

(52) U.S. Cl.
CPC .............. *G06F 9/5005* (2013.01); *G06T 15/50* (2013.01); *G06F 2209/5017* (2013.01); *G06T 2210/52* (2013.01)

(58) Field of Classification Search
CPC . G06F 1/00; G06F 2209/5017; G06F 9/5005; G06T 15/50; G06T 15/005; G06T 2200/16; G06T 2210/52
See application file for complete search history.

(56) References Cited

U.S. PATENT DOCUMENTS

| | | | | |
|---|---|---|---|---|
| 2003/0212742 | A1* | 11/2003 | Hochmuth et al. | 709/204 |
| 2004/0150642 | A1* | 8/2004 | Borshukov et al. | 345/426 |
| 2009/0128568 | A1* | 5/2009 | Gloudemans et al. | 345/474 |
| 2010/0271368 | A1* | 10/2010 | McNamara et al. | 345/420 |
| 2010/0306813 | A1 | 12/2010 | Perry et al. | |
| 2011/0304634 | A1 | 12/2011 | Urbach | |

OTHER PUBLICATIONS

S. Lee Gooding, Laura Arns, Preston Smith and Jenett Tillotson, "Implementation of a Distributed Rendering Environment for the TeraGrid", Challenges of Large Applications in Distributed Environments, 2006 IEEE, p. 13-21.*
Anthony A. Apodaca and Larry Gritz, "Advanced RenderMan: Creating CGI for Motion Pictures", Morgan Kaufmann Publishers, 2000, Chapter 3.*
International Search Report (PCT/US2012/050165) dated Feb. 28, 2013; 3 pages.
Gooding, et al. "Implementation of a Distributed Rendering Environment for the TeraGrid"; 2006; 10 pages.
Apodaca, et al "Advanced RenderMan: Creating CGI for Motion Pictures"; 5 pages; 2000.

* cited by examiner

*Primary Examiner* — Sing-Wai Wu
(74) *Attorney, Agent, or Firm* — James J. DeCarlo; Greenberg Traurig, LLP

(57) ABSTRACT

In one embodiment, a method includes distributing rendering tasks to connected client nodes having capable graphics processing units by transmitting viewport state data objects and a unique spatial location to each of the clients, performing path tracing at each of the clients from the starting point of their unique spatial locations, and transmitting their rendered output back to the server. The server generates a composite rendered output from the individual rendered outputs received by the participating clients, and then transmits the composite to all connected clients for display. Thus, as the number of client nodes increases, the scene is rendered more rapidly and at higher quality. In particular embodiments, the rendered output is a lightmap representing the diffuse lighting for the scene, and each client may render the scene's specular highlights from its own viewport.

20 Claims, 7 Drawing Sheets

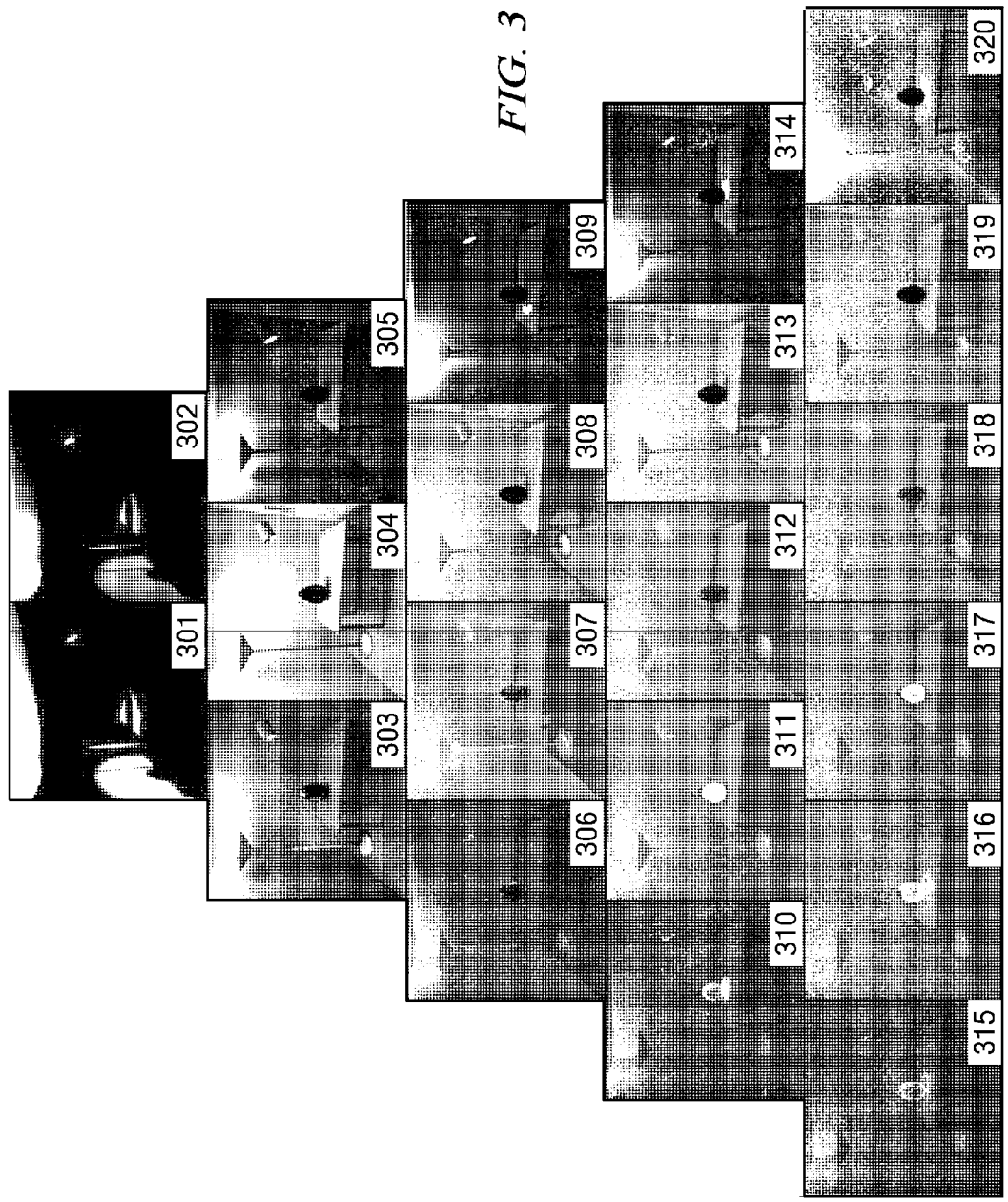

CROWD-SOURCED VIDEO RENDERING SYSTEM

TECHNICAL FIELD

The present disclosure generally relates to distributed, crowd-sourced graphics rendering of applications, and more specifically relates to a server utilizing the graphics processing units of one or more connected clients to perform diffuse light rendering, receiving the rendered scenes from the one or more connected clients, generating a composite scene from the received scenes, and transmitting the composite scene to all connected clients.

BACKGROUND

A client-server architecture, in general, is a distributed computing architecture that partitions tasks or work loads between servers, which may be considered as "service providers", and clients, which may be considered as "service requesters" or "service consumers". Often, the servers and the clients are connected via a computer network and various types of data may be transmitted between individual servers and individual clients bi-directionally over the computer network. Traditionally, servers usually have more resources and greater performance capabilities than the clients. A server may share its resources with one or more clients, such as performing certain tasks for the clients (i.e., providing services to the clients). Because a server typically has more resources than a client, the server may complete a task, especially a resource-demanding task, much faster than the client is able to.

Data exchanged between a server and a client may be represented using any suitable data format and transmitted using any suitable communications protocol. For example, when an application is executed on a server for a client, the output of the application may be represented using a structured document, such as a HyperText Markup Language (HTML) document or an Extensible Markup Language (XML) document. The server may transmit the HTML or XML document, which includes the data that represent the output of the application, to the client over a HyperText Transfer Protocol (HTTP) connection between the server and the client. The client, upon receiving the HTML or XML document, may consume the document and render the output of the application locally using the HTML or XML document, such as in a web browser executed on the client.

SUMMARY

The present disclosure generally relates to a crowd-sourced graphics rendering system that distributes rendering tasks among one or more connected clients that transmit rendered output back to a server, which composites the client output into a single rendered output for transmission and display to all connected clients.

In the context of server-side graphics rendering, a single server may include an array of graphics processing units (GPUs) to render graphics objects and stream the output to clients. However, rendering complex 3D environments is expensive in terms of processor cycles, and additional GPUs or servers must be added to adequately provide rendered frames or scenes to attached clients. Thus, traditional server-side graphics rendering encounters significant scalability issues. It may be prohibitively expensive for the provider to add servers or GPUs to meet the demands of an increasing number of clients; conversely, overinvestment in server or GPU infrastructure results in underutilization when demand falls below capacity.

Additionally, in recent years, the number of consumer-level devices having GPUs capable of quickly performing relatively complex 3D rendering has increased dramatically. For example, whereas the number of personal computers possessing GPUs capable of performing path tracing of a 3D scene in under a minute may have been limited to a handful of computers in the early 2000's, currently over forty-million personal computers possess GPUs with this capability. Therefore it is desirable to leverage these client-side GPUs to off-load graphics rendering tasks from the server to the clients, in effect crowd-sourcing the rendering of a given frame or environment.

In one embodiment, a computer system hosts a plurality of application instances, each application instance corresponding to a remote client application. The computer system maintains a network connection to each of the remote client applications for which an application instance is hosted. In particular embodiments, the application instance is a software stub, as further discussed below. In particular embodiments, the computer system transmits render assets to the client applications for computers having sufficiently powerful GPUs to contribute to rendering. In particular embodiments, the computer system transmits render assets in the form of viewport state data objects (VSDOs) as further discussed below. In particular embodiments, the computer system also transmits or assigns a unique spatial position to each client participating in the crowd-sourced rendering process. In particular embodiments, the client devices utilize the received render assets and the unique viewpoint to render the frame or environment. In particular embodiments, the client devices perform path tracing to render the diffuse lighting of a scene or environment. After completing its assigned rendering task, each participating client device transmits its rendered output back to the computer system. In particular embodiments, the rendered output is a frame from a particular viewpoint. In particular embodiments, the rendered output is a lightmap for the diffuse lighting of the environment. In particular embodiments, the rendered output is a modified VSDO. Upon receiving the rendered outputs, the computer system generates a composite rendered output for transmission back to all connected clients, even those that did not participate in the crowd-sourced rendering process.

In particular embodiments, each connected client views the scene from the exact same viewpoint, and the computer system transmits a composite frame from the specific viewpoint to each connected client for display. In particular embodiments, each connected client views the scene from a different perspective, and the computer system transmits a composite render asset for the individual clients to use in their own rendering engine. In particular environments, the render asset is a light map or VSDO containing light map data representing the diffuse lighting of the environment. Thus, clients may render the scene from different viewpoints using the render assets while retaining high-quality radiosity lighting. In particular embodiments, the clients render the fast-changing specular lighting locally and in conjunction with the received render assets containing the crowd-sourced diffuse lighting for the environment. Thus, as the number of client nodes possessing capable GPUs increases, any particular scene may be rendered more quickly or at higher graphics quality.

These and other features, aspects, and advantages of the disclosure are described in more detail below in the detailed description and in conjunction with the following figures.

BRIEF DESCRIPTION OF THE DRAWINGS

FIG. 3 illustrates example received client frames for a given scene.

DETAILED DESCRIPTION

Figure 1:
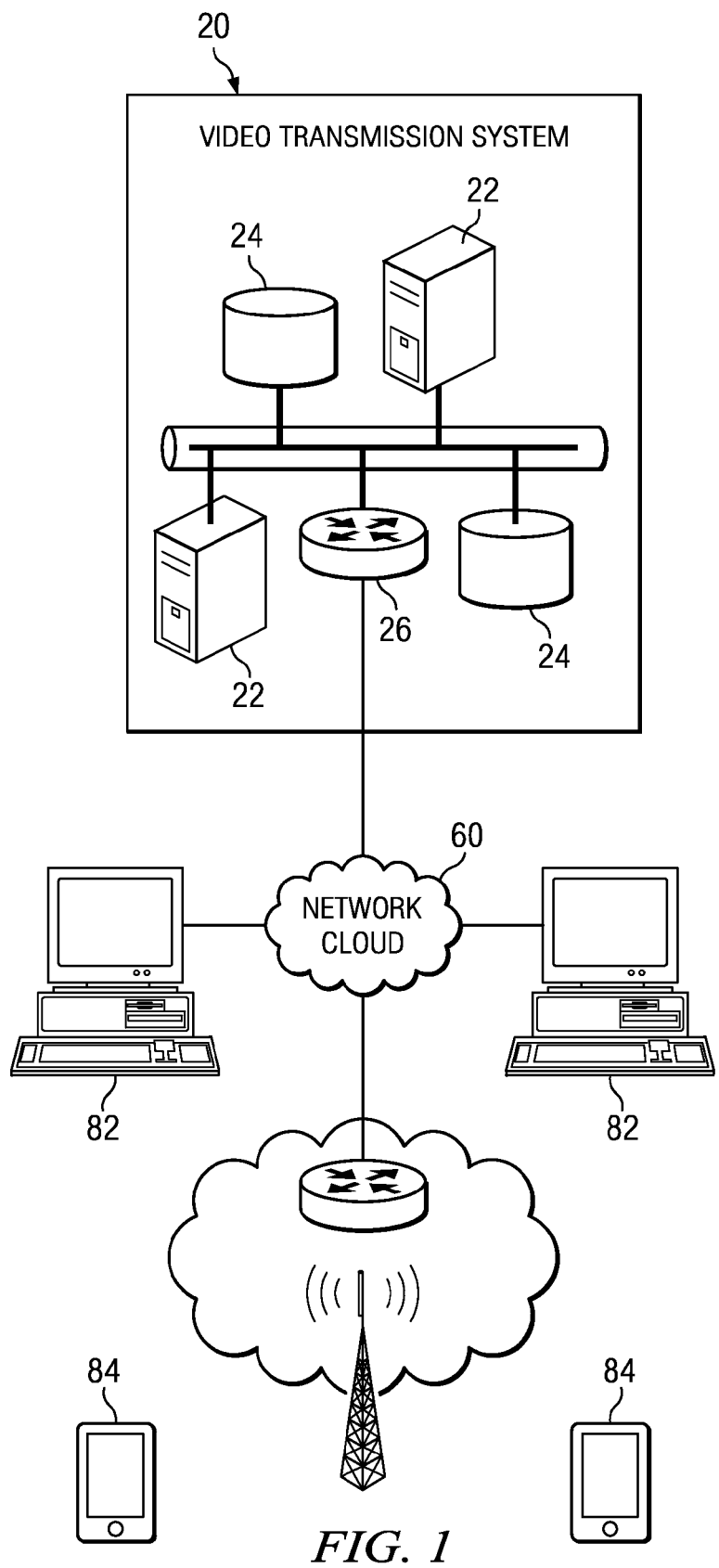
FIG. 1 illustrates an example client-server system implementing a crowd-sourced graphics rendering system.

The present disclosure is now described in detail with reference to a few embodiments thereof as illustrated in the accompanying drawings. In the following description, numerous specific details are set forth in order to provide a thorough understanding of the present disclosure. It is apparent, however, to one skilled in the art, that the present disclosure may be practiced without some or all of these specific details. In other instances, well known process steps and/or structures have not been described in detail in order not to unnecessarily obscure the present disclosure. In addition, while the disclosure is described in conjunction with the particular embodiments, it should be understood that this description is not intended to limit the disclosure to the described embodiments. To the contrary, the description is intended to cover alternatives, modifications, and equivalents as may be included within the spirit and scope of the disclosure as defined by the appended claims.

A client-server architecture enables a server to share its resources with one or more clients. Such an architecture has various advantages. For example, because the servers typically have more resources (e.g., processor or memory) and greater performance capabilities than the clients, a server may complete a task faster than a client is able to. Such performance difference is especially noticeable when the task is resource-intensive or when the client has a limited amount of resources. At the same time, while the server is performing the task on behalf of or for the client, the resources of the client may be freed up to perform other tasks, such as those tasks that need to be performed locally on the client (e.g., interacting with the user of the client).

One type of task that may be suitable to be performed on the servers may be the rendering of an application hosted by a server as video output for transmission to a client. In the context of computer graphics, rendering may be considered as the process of generating an image from a model, usually by means of computer programs. The model is usually a description of three-dimensional (3D) objects and may be represented in a strictly defined language or data structure. The model may contain geometry, viewpoint, texture, lighting, shading, motion, and other suitable types of information. The image into which the model is rendered may be a digital image or a raster graphics image, which may be formed by a collection of pixels. The present disclosure expands the concept of rendering to generating an image that represents any output of any application. The rendering may be performed based on any data, including two-dimensional (2D) data as well as 3D data. In addition to generating images based on 3D models, particular embodiments may render images that represent the output of applications such as, for example and without limitation, web browsing applications, word processing applications, spread sheet applications, multimedia applications, scientific and medical applications, and game applications.

However, as previously disclosed, purely server-side graphics rendering architectures scale poorly due to the cost of additional servers and GPUs. Additionally, systems that have properly added server/GPU infrastructure to meet peak demand are often severely underutilized during off-peak hours, resulting in wasted or idle server or GPU resources.

Peer-to-Peer architectures are well-known in the art for partitioning tasks between peers. Peer-to-peer networks offer the advantage of increasing the total capacity and resources of the system as more nodes enter the network. For example, in a BitTorrent network, the more nodes that share or "seed" a file, the faster the file transfers to other nodes requesting the file. Peer-to-peer networks are prevalent in file sharing and streaming content delivery applications, but due to their decentralized nature they suffer from high latency that generally makes them unsuitable for real-time operations such as graphics rendering. This disclosure provides a centralized server-based server model for that offloads graphics rendering tasks to client nodes, thereby obtaining many of the advantages of peer-to-peer architectures in the context of graphics rendering.

Furthermore, existing methods of multi-GPU rendering scale poorly. Typically, multi-GPU systems utilize one of two methodologies, split frame rendering (SFR) or alternative frame rendering (AFR). In SFR, each GPU renders a portion of each frame. However, the allocation of processing is often uneven, such as where one portion of the frame contains complex geometry and another portion of the frame contains relatively simple geometry. While many distribution algorithms may take into account the portion's graphical complexity, as the number of GPUs increase, the distribution algorithm becomes increasingly complex and processor intensive in and of itself. AFR involves distributing the rendering of complete frames to individual GPUs in a round-robin fashion. However, this technique scales poorly because of increased latency due to the next frame rendering in advance of the frame before it. Additionally, as the number of GPUs approaches a significant percentage of the framerate, it is logically impossible for the next GPU to know ahead of time what the next frame should look like.

One embodiment of the present disclosure solves the multi-GPU scalability issue by utilizing path tracing to render the diffuse lighting of a given 3D environment. Path tracing is a rendering technique that attempts to simulate the physical behavior of light as closely as possible by tracing multiple rays from a virtual camera through several bounces on or through objects. The image quality provided by path tracing is generally superior to that of images produced using conventional rendering methods at the cost of much greater computation requirements. Path tracing naturally simulates many effects that have to be specifically added to other methods (ray tracing or scanline rendering), such as soft shadows, depth of field, motion blur, caustics, ambient occlusion, and indirect lighting. Due to its accuracy and unbiased nature, path tracing is used to generate reference images when testing the quality of other rendering algorithms. However, because of the infinite number of hypothetical lighting paths, a relatively large number of samples must be computed before a rendered scene or frame converges onto a "perfectly lit" image. By distributing the generation of path-traced samples, embodiments of the present invention disclose a distributed graphics rendering system that provides the infinite scalability and benefits of a peer-to-peer architecture; i.e., the more nodes that participate in the crowd-sourced rendering process, the higher the rendering speed and quality of the output, without the high cost traditionally associated with server-side graphical rendering.

FIG. 1 illustrates an example network environment in which particular implementations of the invention may operate. As FIG. 1 illustrates, particular implementations of the invention may operate in a network environment comprising a video transmission system (VTS) 20 that is operatively coupled to a network cloud 60, which may include the Internet. Network cloud 60 generally represents one or more interconnected networks, over which the systems and hosts described herein can communicate. Network cloud 60 may include packet-based wide area networks (such as the Internet), private networks, wireless networks, satellite networks, cellular networks, paging networks, and the like. Some of the networks in network cloud 60 may be circuit-switched networks. The computer network environment, including network 60 can be a packet-based communications environment, employing TCP/IP protocols (for example), and/or other suitable protocols, and has a plurality of interconnected digital packet transmission stations or routing nodes. Client nodes 82 and 84 are operably connected to the network environment via a network service provider or any other suitable means. Client nodes 82 and 84 may include personal computers or cell phones, as well as other types of mobile devices such as lap top computers, personal digital assistants (PDAs), etc. Client nodes 82 include GPUs capable of performing some or all of the rendering tasks required to render a given frame or scene. Client nodes 84 may include low power devices, such as PDAs, cellular phones, tablet PCs, portable gaming systems, or the like, may possess thin-clients and lack adequate graphics processing power to participate in the crowd-sourced rendering system.

Video transmission system 20 is a network addressable system that hosts one or more virtual worlds, one or more videos or movies, or any 3D environment which may be rendered for display on client nodes 82 and 84. Video transmission system 20 may include web site and server functionality where users may request and receive identified web pages. video and other content over the computer network.

In particular implementations, video transmission system 20 comprises one or more physical servers 22 and one or more data stores 24. The one or more physical servers 22 are operably connected to computer network 60 via a router 26. The one or more physical servers 22 host functionality that allows users to browse available content, such as receiving requests from, and transmitting responsive data to, client nodes 82 and 84. The connection from router 26 to network cloud 60 should have bandwidth sufficient to support simultaneously receiving rendered output from a plurality of client nodes 82 and 84, and transmitting composite rendered output to client nodes 82 and 84. Video transmission system 20 acts as both a receiver and a broadcasters, and the pipe at router 26 should be sufficiently fat, or high-bandwidth, to support such functionality. In one implementation, the functionality hosted by the one or more physical servers may include web or HTTP servers, RTSP servers, and the like.

Physical servers 22, as discussed above, host functionality directed to supporting and implementing video transmission system 20. In one implementation, a data store 24 may store video content such as digital content data objects, user information, and other media assets. A content data object or a content object, in particular implementations, is an individual item of digital information typically stored or embodied in a data file or record. Content objects may take many forms, including: text (e.g., ASCII, SGML, HTML), images (e.g., jpeg, tif and gif), graphics (vector-based or bitmap), audio, video (e.g., mpeg), or other multimedia, and combinations thereof. Content object data may also include executable code objects, object or asset definitions, etc. Structurally, content data store 24 connotes a large class of data storage and management systems. In particular implementations, content data store 24 may be implemented by any suitable physical system including components, such as database servers, mass storage media, media library systems, and the like.

In particular embodiments, the crowd-sourced rendering system is implemented via a software program. In particular embodiments, the software program, hereafter referred to as a "software stub" or simply a "stub", may be installed and executed on client nodes 82 and 84. In particular embodiments, the stub may establish a network connection between client nodes 82 and 84, and video transmission system 20, and download computer software programs from video transmission system 20 over the network connection to client nodes 82 and 84. In particular embodiments, the executable code of a piece of software downloaded from video transmission system 20 to client nodes 82/84 may be embedded in a data stream sent from VTS 20 to clients 82/84 over the network connection. Upon receiving the data stream, the stub may extract the executable code of the piece of software and load it directly into the Random-Access Memory (RAM) of clients 82/84 for execution on the client. The piece of software is not saved in or installed onto any permanent storage (e.g., the hard drive) of the client. Once the piece of software completes its execution on clients 82/84, the RAM space in which the executable code of the piece of software is loaded may be released and the piece of software no longer exists anywhere on clients 82/84. In particular embodiments, the stub program installs a rendering engine or application on client nodes 82 that are capable of participating in the crowd-sourced graphics rendering system, and only a viewer application on client nodes 84, which lack the requisite processing capacity to participate in crowd-sourced rendering.

In particular embodiments, the stub may be a standalone software program saved or installed on clients 82/84 or a plug-in or add-on to a web browser installed on clients 82/84. The stub may be saved or installed on clients 82/84 using any suitable existing methods for distributing computer software programs to individual computer systems (e.g., CD, DVD, network downloading, etc.). In particular embodiments, the stub may be a thin piece of software (i.e., small in size) so that it does not use much storage capacity of client nodes 82/84. The stub may be executed by itself if it is a standalone software program or via the web browser if it is plug-in or add-on software.

By using a stub to download and launch computer software programs on clients 82/84, only the stub itself needs to be permanently saved or installed on clients 82/84. The other pieces of software may be downloaded and launched on clients 82/84 without having to be saved or installed on clients 82/84, which may decrease the usage of the storage capacity of clients 82/84. Furthermore, since a piece of software is downloaded just prior to its execution on one of client nodes 82/84, particular embodiments facilitate providing the latest (or any desired) version of the software each time the piece of software is downloaded and launched.

For a detailed discussion of software stubs, please see commonly-owned U.S. utility patent application, U.S. patent application Ser. No. 12/624,133, entitled, "Stream-Based Software Application Delivery and Launching System", filed on Nov. 23, 2009, and herein fully incorporated by reference.

Although FIG. 1 describes a centralized client-server architecture, this disclosure contemplates any manner of network topology for communicating between multiple client nodes. In particular embodiments, the client nodes may be arranged as a peer-to-peer network, where one particular node is designated the central node and substantially performs the same functions as VTS 20. In particular embodiments, a ring topology may be utilized, and a particular peer may be designated as the ring leader performing substantially the same function as VTS 20. This disclosure contemplates any suitable network topology for distributing graphics processing to peer nodes, including but not limited to bus, star, mesh, and tree network topologies.

Figure 2:
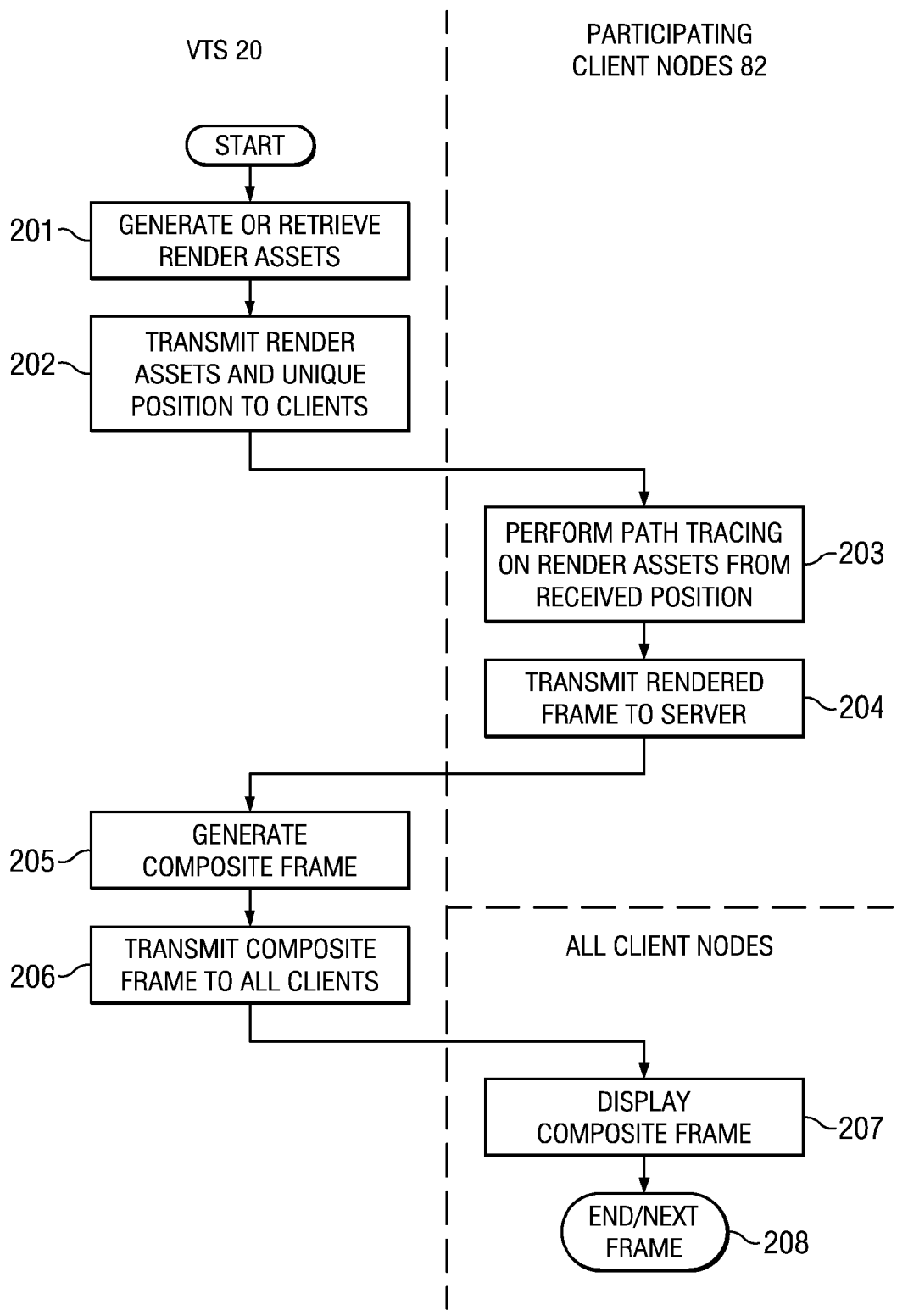
FIG. 2 illustrates a method of distributing the rendering of a frame from a fixed viewpoint to a plurality of clients.

FIG. 2 illustrates an example method of crowd-sourcing the rendering of a single frame from the same viewpoint for every client. For example, the method of FIG. 2 may be utilized where the connected client nodes 82 and 84 are all watching the same movie or video, for example a computer-generated movie such as Toy Story 3. The actions performed by VTS 20 are depicted on the left-half of FIG. 2, the actions of the participating nodes 82 are depicted in the upper-right quadrant, and the actions of all client nodes 82 and 84 are depicted in the lower right quadrant.

At Step 201, VTS 20 accesses the render assets required to render a frame. In particular embodiments, the render assets may be stored and subsequently retrieved from data store 24. In particular embodiments, the render assets may be generated dynamically by VTS 20. In particular embodiments, render assets may be the actual 3D wireframe models in a given environment, scene or frame. However, this method is bandwidth-intensive, and does not take advantage of compression of 3D objects. In particular objects, the render assets are cubic maps from the camera viewpoint. In particular embodiments, the render assets comprise layered cube maps called VSDOs that may be rendered into pixel values for a given frame using a pixel or fragment shader.

A cube map is essentially six texture maps stitched into a cube. Each texture map includes texels, which are pixel information regarding a scene relative to a common reference point. A texture map on the face of a cube can be generated by rendering a scene from a common reference point using the faces of the cube as window rectangles. Each texel may contain material properties (index of refraction, color, etc.), the distance from the reference point, and a surface normal vector. A set of layered texture maps representing a scene can be obtained using depth peeling. The number of peeling passes can be limited to control the number of layers. VSDOs can be initially generated on a rendering device on-the-fly or stored for subsequent transmission in response to a request for a video. A rendering device can efficiently generated VSDO on a GPU, using cube maps and multiple render targets with depth peeling or some other suitable process.

Each texel in a layered texel array (comprised of depth-sorted layers of a scene) stores information on all object points between the reference point and the farthest object point within the depth peeling layer of the texel. To generate a rendered representation of a scene corresponding to a layered cube map, a graphics processing unit may trace rays from a common origin to determine the distances between the origin and objects in the scene, using a fragment shader unit to compute the radiance at points visible from the origin. The render processing typically involves rasterizing the scene geometry and finding the first hits where the rays pass through the pixels. For a detailed discussion of VSDOs and VSDO rendering, please see commonly-owned U.S. utility patent application, U.S. patent application Ser. No. 12/484,462, entitled, "Re-Utilization of Render Assets for Video Compression", filed on Jun. 15, 2009 and herein fully incorporated by reference.

At Step 202, VTS 20 transmits the render assets, in this example, the VSDOs for the scene or environment, to any client nodes 82 that possess GPUs capable of participating in the crowd-sourced rendering process. In particular embodiments, only the first frame of a given scene requires VSDOs to be transmitted to the client, and subsequent frames only require draw instructions describing how the camera or individual objects have changed. In particular embodiments, the static elements of a particular scene may be transmitted as one VSDO and the dynamic elements of a scene are transmitted as a separate VSDO; thus, even in an actively changing scene, only the dynamic VSDO need be updated or transmitted. This disclosure contemplates any suitable manner of compressing video data or conserving bandwidth through the re-use of previously transmitted VSDOs.

VTS 20 also transmits a unique spatial position to each client node 82 participating in the crowd-sourced rendering process. The unique spatial position represents the position of a virtual eye or lens for path tracing; each client node 82 traces a hypothetical ray backwards from its unique spatial position until it hits a light source (possibly never). In particular embodiments, the unique spatial position assigned to each client node 82 is randomly assigned by VTS 20. In particular embodiments, the unique position is based off a path tracing algorithm that attempts to identify rays that have a high probability striking a light source. In particular embodiments, the path tracing algorithm slightly modifies previously-traced successful paths. In particular embodiments, the path tracing algorithm selecting the unique spatial positions is the Monte Carlo, Kajiya, or Metropolis-Hastings (as described in Metropolis Light Transport) algorithm. This disclosure contemplates any suitable path tracing algorithm or method of assigning unique spatial locations to client nodes participating in the crowd-sourced rendering process.

At Step 203, client nodes 82 perform path tracing on the received render assets from the unique spatial position. As previously stated, the render assets may be one or more VSDOs, transform or draw instructions for previously transmitted VSDOs, or any combination of the two. In particular embodiments, client nodes 82 perform bidirectional path tracing. This disclosure contemplates any suitable manner of obtaining path tracing samples. As a result of the path tracing operation, client devices 82 generate sample frames that are rough estimates of the diffuse lighting of the frame. Client nodes 82 are capable of generating these sample frames, although poor estimates of the lighting of the scene and highly noisy, relatively quickly.

At Step 204, each client node 82 participating in the crowd-sourced rendering process transmits its rendered frame back to VTS 20. In particular embodiments, the lighting data may be added to the VSDOs and client nodes 82 may transmit back VSDOs enhanced by the lighting data. In particular embodiments, only the light map, or a texture including the lighting information mapped onto the VSDO, is transmitted back to VTS 20. This disclosure contemplates any suitable manner of bandwidth optimization or video compression.

At Step 205, VTS 20 generates a composite frame from the received frame. Due to the additive nature of light, VTS 20 may quickly generate the composite frame by adding all the received frames together and dividing by the number of received frames. In particular embodiments, VTS 20 uses a large floating point buffer to store the result of the summation. In particular embodiments, VTS 20 generates a composite light map from received light maps and maps the composite map onto the VSDOs. This disclosure contemplates any suitable manner of generating a composite frame. The composite frame should converge, depending on the complexity of the scene and the number of samples, to perfect radiosity lighting. For example, 8 client nodes generating 8 separate samples may produce a fairly good representation of the frame, 64 would yield a composite frame with very little noise, and 1000 samples may generate a frame with perfect diffuse lighting.

At Step 206, VTS 20 transmits the composite frame to every client node (both participating nodes 82 and non-participatory nodes 84) viewing the video stream, and at Step 207, the individual client nodes 82/84 display the received composite frame on their displays. At step 208, the process ends and the VTS transmits the render assets, transform and draw instructions, or a mixture of the two, for the next frame in the video sequence.

Figure 3A:
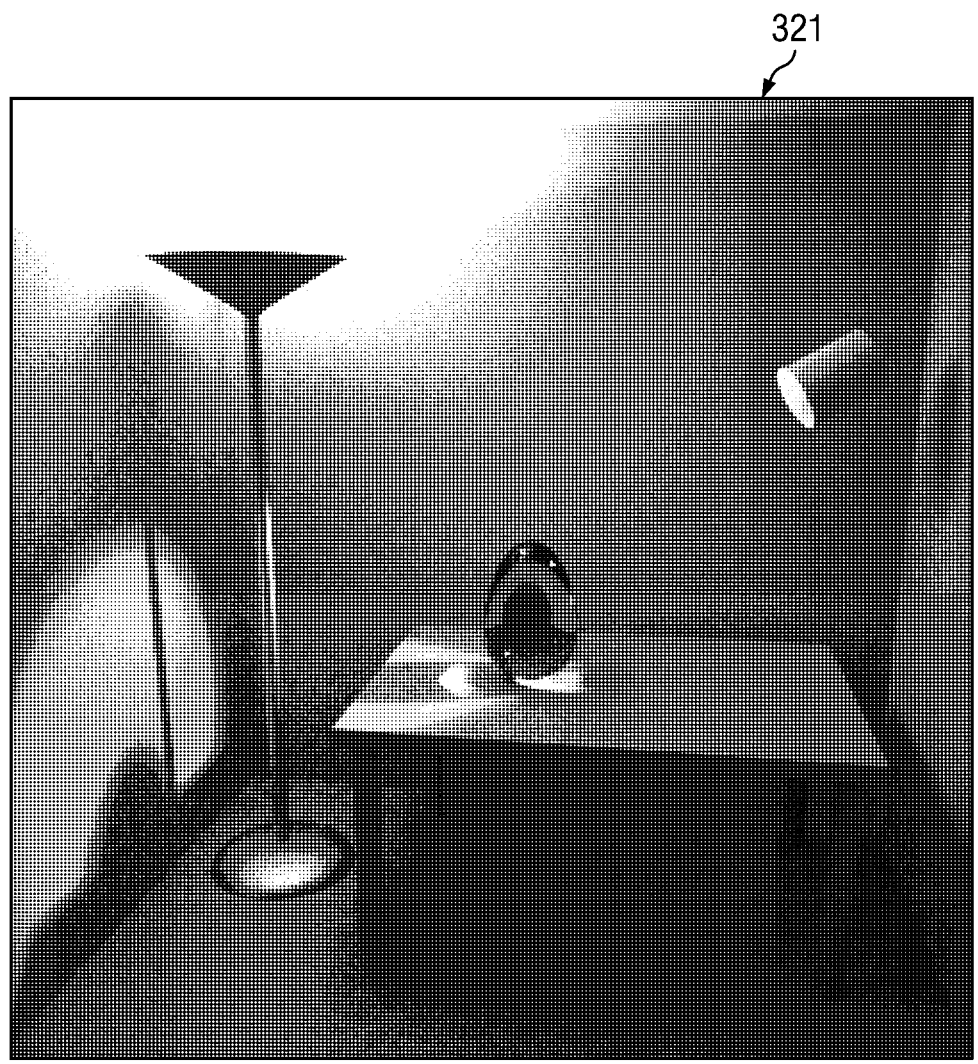
FIG. 3A illustrates a composite frame generated by adding the received client frames of FIG. 3.

FIG. 3 illustrates an example of rendered frames received by client nodes 82. Each frame 301-320 represents the output from an individual client node 82 obtained by performing path tracing from a unique spatial position for a given scene. Frames 301-320 vary in clarity; for example, frames 301 and 302 depict very little detail about the objects in the scene, whereas frame 320 gives a viewer a fairly good, although noisy, representation of the scene. FIG. 3A represents an example composite frame 321 generated by adding frames 301-320. Although still somewhat noisy, the composite frame offers a clear picture of the scene, and contains highly accurate diffuse lighting, including soft reflections, shadows, transparencies, and caustics. FIGS. 3 and 3A depict the additive nature of light as well as a representation of the quality obtainable through combining 20 frames generated by path tracing. Thus the present invention is analogous to peer-to-peer file sharing; such as "seeding" in BitTorrent; the greater the number of participating client nodes 82, the higher the speed of rendering and the quality of the rendered output that is delivered to all nodes requesting the output. For example, in particular embodiments where the required number of samples to be composited for a scene exceeds the number of participating nodes, the central server or participating nodes must perform multiple renders, thereby increasing the total rendering time. As more client nodes possessing a compatible GPU "seed" the scene, the rendering speed increases.

Figure 4:
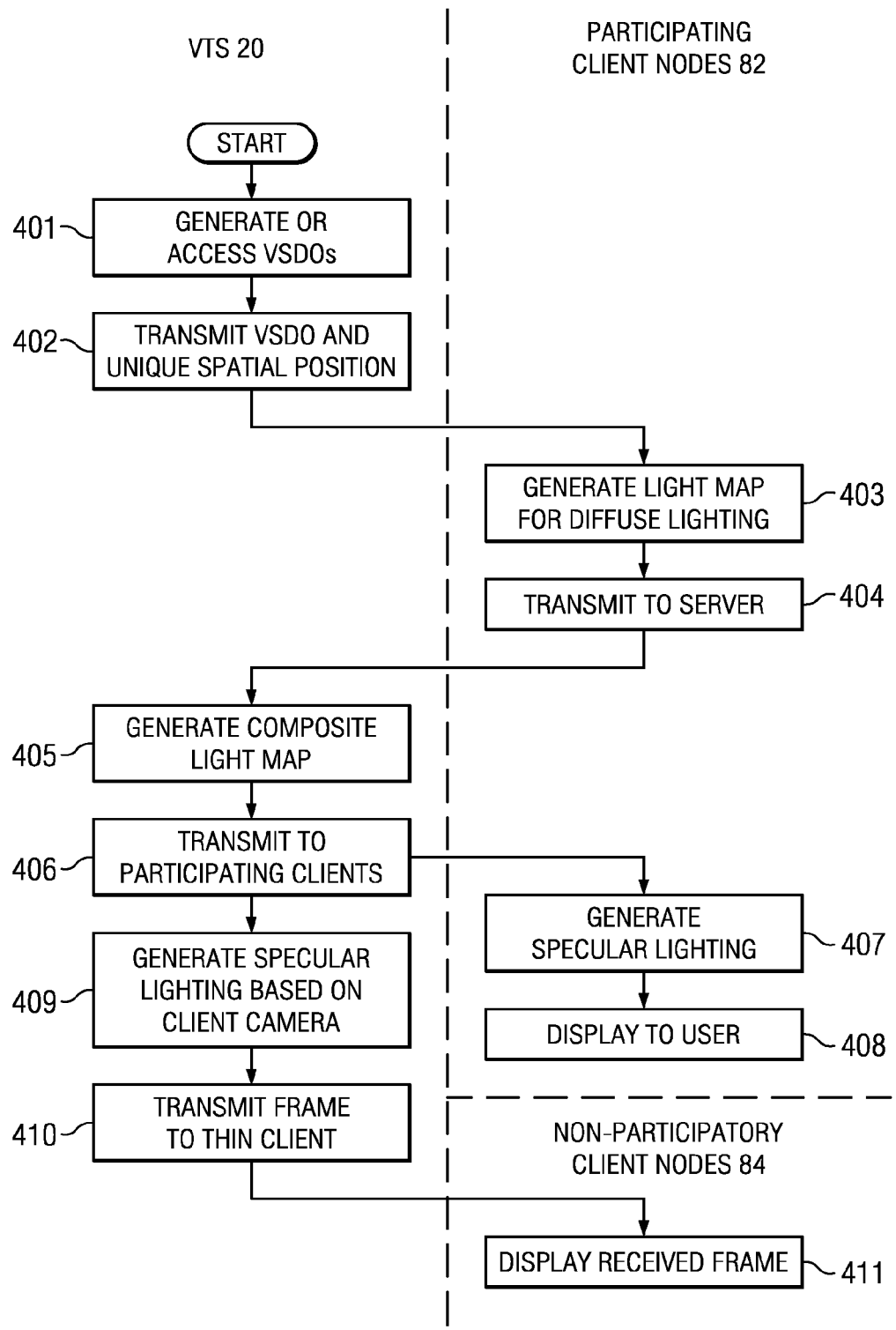
FIG. 4 illustrates a method of distributing the rendering of an environment to a plurality of clients.

FIG. 4 illustrates an example method of distributing the rendering of an environment to a plurality of clients in accordance with one embodiment of the invention. In particular embodiments, multiple users of VTS 20 may utilize interactive programs, where the display of each client node 82/84 is not locked to a particular camera viewpoint. For example, a plurality of users may be using a computer aided design (CAD) program such as Maya or 3D Studio Max to independently view a particular environment from various different angles. As another example, a number of client nodes may be playing a video game, with multiple users interacting in the same environment. For example, a plurality of users, via devices of varying processing power, may all be in a particular room in World of Warcraft.

Figure 5:
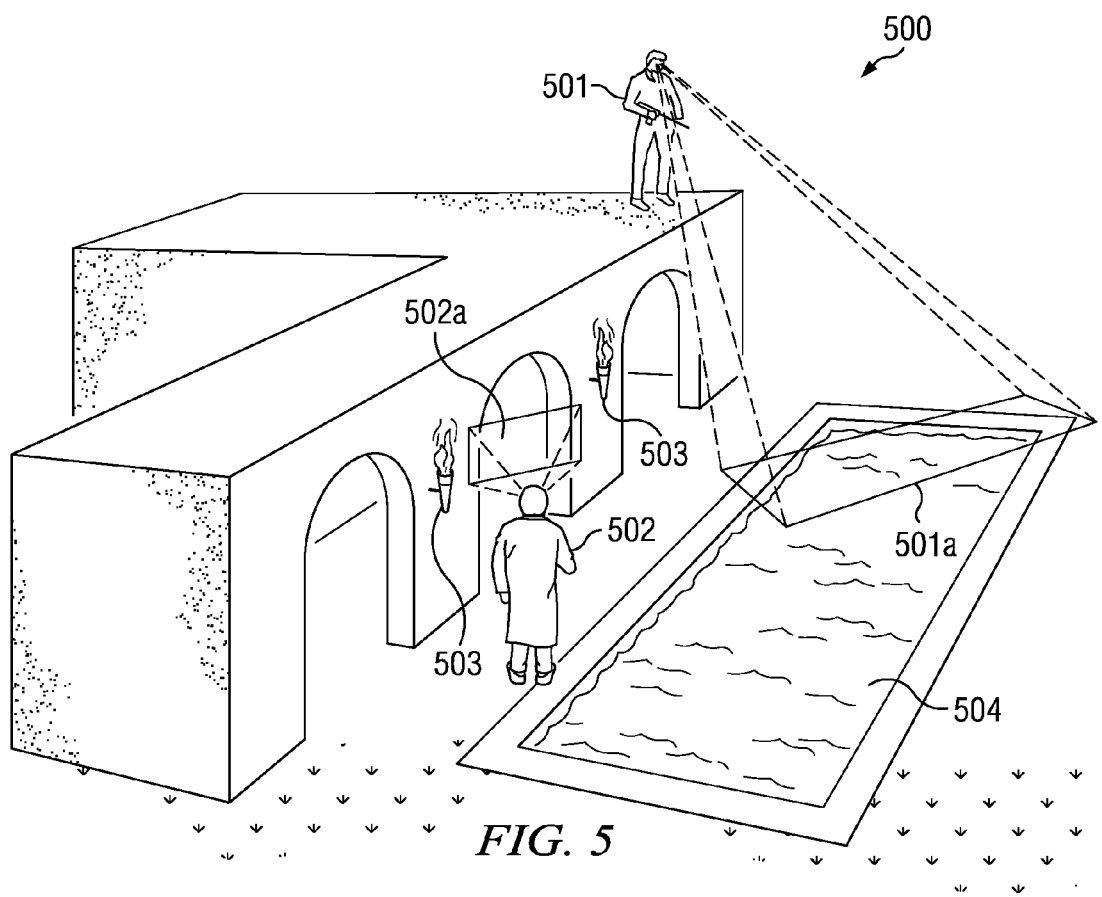
FIG. 5 illustrates an example display output for the clients in FIG. 4.

FIG. 5 illustrates an example of such a scenario. In FIG. 5, 3D environment 500 includes several light sources 503 and a reflection pool 504. Reflection pool 504 may, when rendered, contain both diffuse lighting as well as specular lighting. Two user-controlled characters, 501 and 502, are in environment 500. Each user has a specific camera view and viewport 501a and 502a. Specular lighting, including the reflections from light sources 503 on environment 500, requires knowledge of both the path of light rays as well as each user's viewports 501a and 502a. Therefore, diffuse lighting is relatively slow moving and static when compared to specular lighting, particularly in fast, real-time applications such action games or first-person shooters. For the purposes of this example, user 501 is utilizing a device that is capable of participating in the crowd-sourced rendering process (client node 82), such as a personal computer with a powerful GPU, or a network connected gaming console, and user 502 is utilizing a thin-client device that lacks the graphics processing capacity to perform rendering, even its own specular lighting, such as a mobile phone or tablet computer.

Returning to FIG. 4, at Step 401, VTS 20 generates or otherwise accesses VSDOs for the particular environment 500. VTS 20 may generate the VSDOs in response to a request from software stubs running on client nodes 82 and 84. For example, when the users of client nodes 82/84 launch a game application or transmit commands to the VTS indicating that their player is moving into a specific environment or looking in a particular direction, VTS 20 dynamically generates the VSDOs for the objects in the environment surrounding the user's characters.

At Step 402, VTS 20 transmits the VSDOs and unique spatial location to each participating client node 82. In particular embodiments, VTS 20 transmits the VSDOs only when the client's user enters a new environment. Additionally, at Step 402, VTS 20 transmits a unique position indicator to participating client nodes 82. This unique position indicator is independent of the viewport 501a of the user represented by client node 82, but is rather a random point from which to begin path tracing for the calculation of diffuse lighting. In particular embodiments, the unique spatial position assigned to each client node 82 is randomly assigned by VTS 20. In particular embodiments, the unique position is based off a path tracing algorithm that attempts to identify rays that have a high probability striking a light source. In particular embodiments, the path tracing algorithm slightly modifies previously-traced successful paths. In particular embodiments, the path tracing algorithm selecting the unique spatial positions is the Monte Carlo, Kajiya, or Metropolis-Hastings (as described in Metropolis Light Transport) algorithm. This disclosure contemplates any suitable path tracing algorithm or method of assigning unique spatial locations to client nodes participating in the crowd-sourced rendering process.

At Step 403, client nodes 82 perform path tracing to generate a light map for environment 500. A light map is merely a texture that contains ambient or diffuse lighting data that may be mapped or skinned onto a VSDO. When a light map is mapped onto a VSDO and the VSDO is rendered by a rendering engine, the scene or environment appears accurately lit to the user. In particular embodiments, the light map is merely an additional layer of a VSDO. In particular embodiments, light maps may be transmitted separately from VSDOs. In particular embodiments, light maps may be compressed using 2D compression algorithms such as JPG or discrete cosine transfer (DCT).

At Step 404, each participating client node 82 transmits its light map to VTS 20. In particular embodiments, each client node 82 transmits back an enhanced VSDO. In particular embodiments, each client node 82 compresses its generated light map before transmission. This disclosure contemplates any suitable manner of returning rendered diffuse lighting information to VTS 20.

At Step 405, VTS 20 generates a composite light map based upon received light maps from client nodes 82. The additive properties of light apply equally to light maps as they do to individual frames. In particular embodiments, VTS 20 generates the composite light map by storing the result of a summation of all received light maps in a large floating-point buffer, and dividing the result by the number of received light maps. In particular embodiments, VTS automatically generates the composite light map after a threshold amount of time or number of received client light maps has been reached. Because each client node's light map only marginally increases the quality of the diffuse lighting past a certain threshold, VTS 20 may choose to generate the composite light map without waiting for late-arriving client light maps due to latency. In particular embodiments, VTS 20 waits until every single client node light map has been received before generating the composite light map in order to get the highest quality light map every refresh. Because diffuse lighting is viewpoint-independent and does not change rapidly with the environment (provided the light sources are not moving), users panning changing their viewpoints are less likely to notice latency in refreshing the diffuse lighting of an environment, whereas latency in rendering specular lighting, tied directly to the users' viewpoints, is very noticeable.

At Step 406, VTS 20 transmits the composite light map back to participating client nodes 82. In particular embodiments, VTS 20 transmits back one or more VSDOs for environment 500 enhanced by a layer comprising the composite light map. In particular embodiments, VTS 20 transmits only the composite light map. In particular embodiments, the composite light map may be compressed using 2D compression techniques. In particular embodiments, VTS 20 only transmits the changes between the previous light map for the same VSDO transmitted to client nodes 82 and the composite light map. This disclosure contemplates any suitable mechanism of bandwidth conservation in transmitting diffuse lighting data to client nodes 82.

At Step 407, participating client nodes 82 render the specular lighting for the environment based upon their own viewpoint (such as viewpoint 501*a*). Because participating client nodes 82 possess a GPU powerful enough to perform path tracing for diffuse lighting, they should be powerful enough to render specular lighting. Simultaneously with the generation of specular lighting in Step 407, the users' viewport (such as 501*a*) for each client node 82 is rendered on the displays of client nodes 82.

Because user 502 is utilizing a non-participating client node 84 lacking a GPU powerful enough to perform path lighting, in particular embodiments, VTS 20 assumes client devices 84 lack the processing power to perform its own viewpoint-dependent specular lighting. Thus, VTS 20 renders the entire viewport (such as viewport 502*a*) for client nodes 84 server-side.

At Step 409, VTS 20 renders the viewports of thin client nodes 84 based upon the VSDOs for the environment, the composite light map, and camera information received from each connected client node 84. In particular embodiments, VTS 20 utilizes a hit function to correct for the difference of the origin of the VSDO and the reference point (camera viewport) of each client 84.

At Step 410, VTS 20 transmits the rendered viewport frame for each thin client 84 to its respective client. In particular embodiments, the frames may be compressed via 2D compression techniques. At Step 411, client devices 84 display their received frames on their respective displays.

Thus, particular implementations of the present invention provide a fully scalable, distributed rendering architecture having peer-to-peer like qualities, wherein the quality of the final rendered image is directly correlated to the number of client nodes participating in the distributed rendering system.

Figure 6:
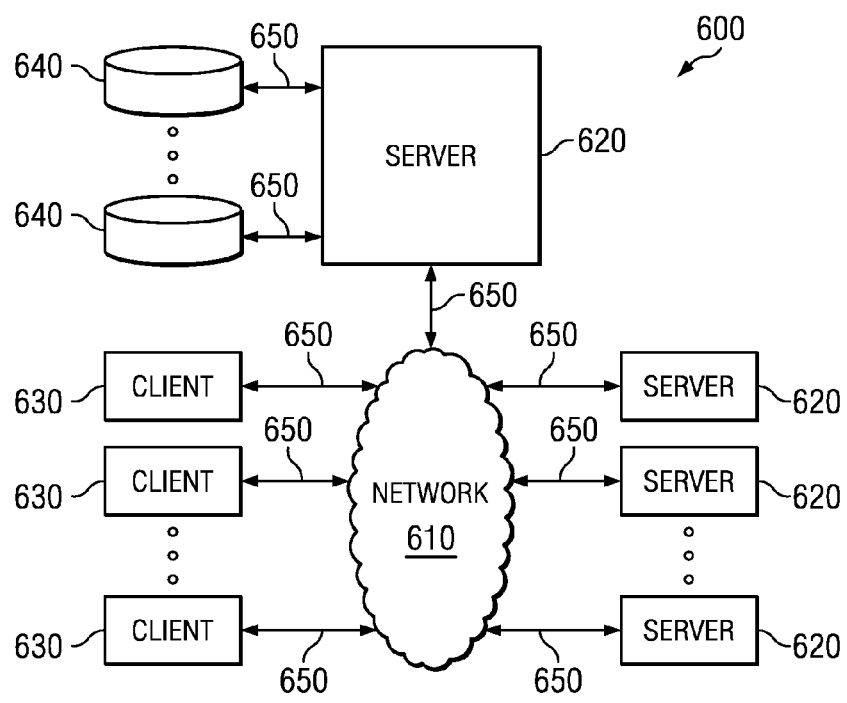
FIG. 6 illustrates an example network environment.

Particular embodiments may be implemented in a network environment. FIG. 6 illustrates an example network environment 600. Network environment 600 includes a network 610 coupling one or more servers 620 and one or more clients 630 to each other. In particular embodiments, network 610 is an intranet, an extranet, a virtual private network (VPN), a local area network (LAN), a wireless LAN (WLAN), a wide area network (WAN), a metropolitan area network (MAN), a communications network, a satellite network, a portion of the Internet, or another network 610 or a combination of two or more such networks 610. The present disclosure contemplates any suitable network 610.

One or more links 650 couple servers 620 or clients 630 to network 610. In particular embodiments, one or more links 650 each includes one or more wired, wireless, or optical links 650. In particular embodiments, one or more links 650 each includes an intranet, an extranet, a VPN, a LAN, a WLAN, a WAN, a MAN, a communications network, a satellite network, a portion of the Internet, or another link 650 or a combination of two or more such links 650. The present disclosure contemplates any suitable links 650 coupling servers 620 and clients 630 to network 610.

In particular embodiments, each server 620 may be a unitary server or may be a distributed server spanning multiple computers or multiple datacenters. Servers 620 may be of various types, such as, for example and without limitation, web server, news server, mail server, message server, advertising server, file server, application server, exchange server, database server, or proxy server. In particular embodiments, each server 620 may include hardware, software, or embedded logic components or a combination of two or more such components for carrying out the appropriate functionalities implemented or supported by server 620. For example, a web server is generally capable of hosting websites containing web pages or particular elements of web pages. More specifically, a web server may host HTML files or other file types, or may dynamically create or constitute files upon a request, and communicate them to clients 630 in response to HTTP or other requests from clients 630. A mail server is generally capable of providing electronic mail services to various clients 630. A database server is generally capable of providing an interface for managing data stored in one or more data stores.

In particular embodiments, each client 630 may be an electronic device including hardware, software, or embedded logic components or a combination of two or more such components and capable of carrying out the appropriate functionalities implemented or supported by client 630. For example and without limitation, a client 630 may be a desktop computer system, a notebook computer system, a netbook computer system, a handheld electronic device, or a mobile telephone. A client 630 may enable an network user at client 630 to access network 610. A client 630 may have a web browser, such as Microsoft Internet Explorer or Mozilla Firefox, and may have one or more add-ons, plug-ins, or other extensions, such as Google Toolbar or Yahoo Toolbar. A client 630 may enable its user to communicate with other users at other clients 630. The present disclosure contemplates any suitable clients 630.

In particular embodiments, one or more data storages 640 may be communicatively linked to one or more servers 620 via one or more links 650. In particular embodiments, data storages 640 may be used to store various types of information. In particular embodiments, the information stored in data storages 640 may be organized according to specific data structures. Particular embodiments may provide interfaces that enable servers 620 or clients 630 to manage (e.g., retrieve, modify, add, or delete) the information stored in data storage 640.

In particular embodiments, each server 620 may concurrently service one or more clients 630 and perform renderings for the clients 630 it supports. A server 620 may transmit the images rendered for a particular client 630 it supports by encoding the rendered images in a video stream, with each rendered image as a particular frame, and transmits the video stream to the client 630. A client 630, upon receiving the video stream, may decode the video stream to exact the image frames for display.

Particular embodiments may be implemented as hardware, software, or a combination of hardware and software. For example and without limitation, one or more computer systems may execute particular logic or software to perform one or more steps of one or more processes described or illustrated herein. One or more of the computer systems may be unitary or distributed, spanning multiple computer systems or multiple datacenters, where appropriate. The present disclosure contemplates any suitable computer system. In particular embodiments, performing one or more steps of one or more processes described or illustrated herein need not necessarily be limited to one or more particular geographic locations and need not necessarily have temporal limitations. As an example and not by way of limitation, one or more computer systems may carry out their functions in "real time," "offline," in "batch mode," otherwise, or in a suitable combination of the foregoing, where appropriate. One or more of the computer systems may carry out one or more portions of their functions at different times, at different locations, using different processing, where appropriate. Herein, reference to logic may encompass software, and vice versa, where appropriate. Reference to software may encompass one or more computer programs, and vice versa, where appropriate. Reference to software may encompass data, instructions, or both, and vice versa, where appropriate. Similarly, reference to data may encompass instructions, and vice versa, where appropriate.

One or more computer-readable storage media may store or otherwise embody software implementing particular embodiments. A computer-readable medium may be any medium capable of carrying, communicating, containing, holding, maintaining, propagating, retaining, storing, transmitting, transporting, or otherwise embodying software, where appropriate. A computer-readable medium may be a biological, chemical, electronic, electromagnetic, infrared, magnetic, optical, quantum, or other suitable medium or a combination of two or more such media, where appropriate. A computer-readable medium may include one or more nanometer-scale components or otherwise embody nanometer-scale design or fabrication. Example computer-readable storage media include, but are not limited to, compact discs (CDs), field-programmable gate arrays (FPGAs), floppy disks, floptical disks, hard disks, holographic storage devices, integrated circuits (ICs) (such as application-specific integrated circuits (ASICs)), magnetic tape, caches, programmable logic devices (PLDs), random-access memory (RAM) devices, read-only memory (ROM) devices, semiconductor memory devices, and other suitable computer-readable storage media.

Software implementing particular embodiments may be written in any suitable programming language (which may be procedural or object oriented) or combination of programming languages, where appropriate. Any suitable type of computer system (such as a single- or multiple-processor computer system) or systems may execute software implementing particular embodiments, where appropriate. A general-purpose computer system may execute software implementing particular embodiments, where appropriate.

Figure 7:
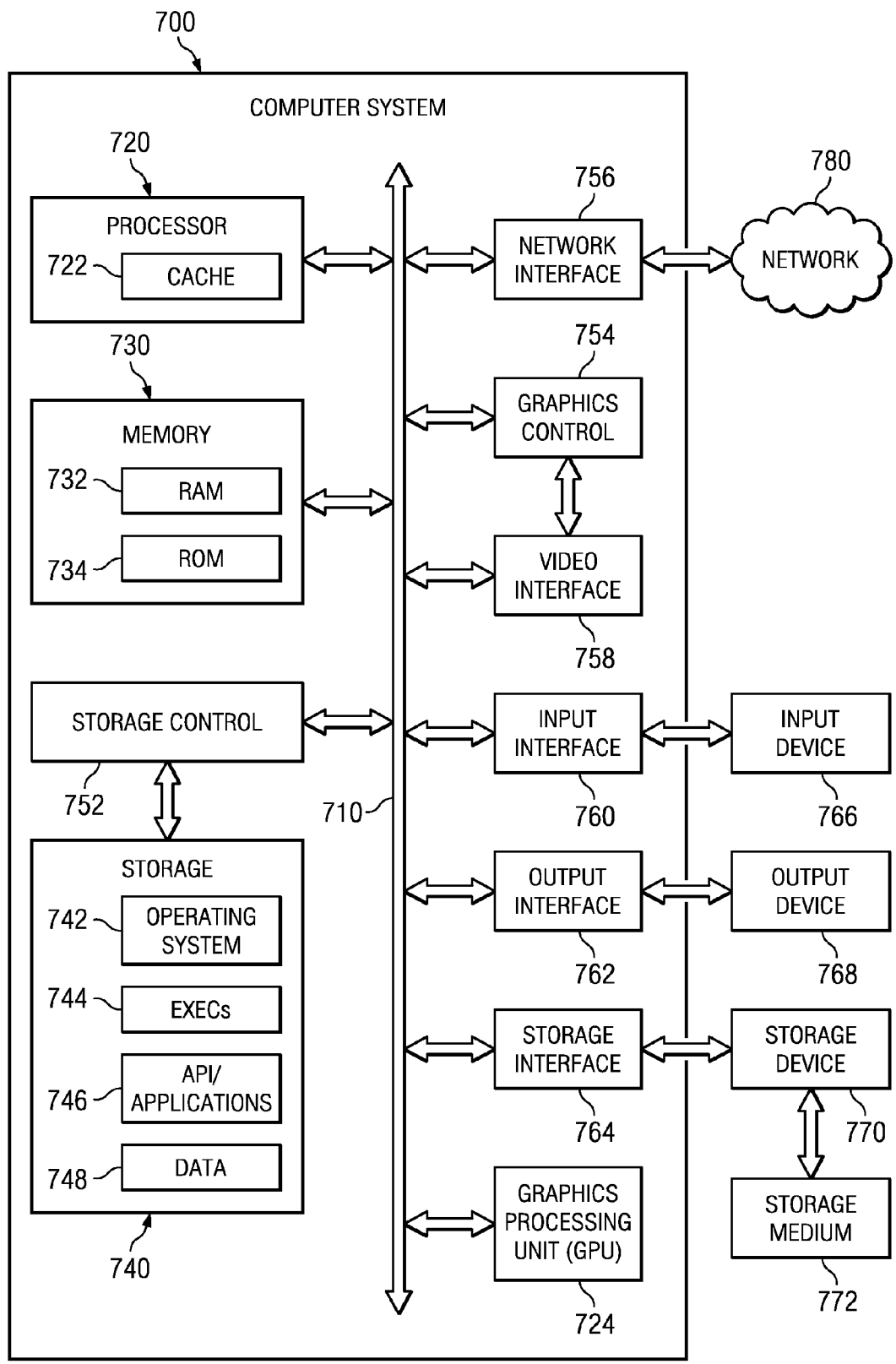
FIG. 7 illustrates an example computing system.

For example, FIG. 7 illustrates an example computer system 700 suitable for implementing one or more portions of particular embodiments. Although the present disclosure describes and illustrates a particular computer system 700 having particular components in a particular configuration, the present disclosure contemplates any suitable computer system having any suitable components in any suitable configuration. Moreover, computer system 700 may have take any suitable physical form, such as for example one or more integrated circuit (ICs), one or more printed circuit boards (PCBs), one or more handheld or other devices (such as mobile telephones or PDAs), one or more personal computers, or one or more super computers.

System bus 710 couples subsystems of computer system 700 to each other. Herein, reference to a bus encompasses one or more digital signal lines serving a common function. The present disclosure contemplates any suitable system bus 710 including any suitable bus structures (such as one or more memory buses, one or more peripheral buses, one or more a local buses, or a combination of the foregoing) having any suitable bus architectures. Example bus architectures include, but are not limited to, Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express bus (PCI-X), and Accelerated Graphics Port (AGP) bus.

Computer system 700 includes one or more processors 720 (or central processing units (CPUs)). A processor 720 may contain a cache 722 for temporary local storage of instructions, data, or computer addresses. Processors 720 are coupled to one or more storage devices, including memory 730. Memory 730 may include random access memory (RAM) 732 and read-only memory (ROM) 734. Data and instructions may transfer bi-directionally between processors 720 and RAM 732. Data and instructions may transfer unidirectionally to processors 720 from ROM 734. RAM 732 and ROM 734 may include any suitable computer-readable storage media.

Computer system 700 includes fixed storage 740 coupled bi-directionally to processors 720. Fixed storage 740 may be coupled to processors 720 via storage control unit 752. Fixed storage 740 may provide additional data storage capacity and may include any suitable computer-readable storage media. Fixed storage 740 may store an operating system (OS) 742, one or more executables 744, one or more applications or programs 746, data 748, and the like. Fixed storage 740 is typically a secondary storage medium (such as a hard disk) that is slower than primary storage. In appropriate cases, the information stored by fixed storage 740 may be incorporated as virtual memory into memory 730.

Processors 720 may be coupled to a variety of interfaces, such as, for example, graphics control 774, video interface 758, input interface 760, output interface 762, and storage interface 764, which in turn may be respectively coupled to appropriate devices. Example input or output devices include, but are not limited to, video displays, track balls, mice, keyboards, microphones, touch-sensitive displays, transducer card readers, magnetic or paper tape readers, tablets, styli, voice or handwriting recognizers, biometrics readers, or computer systems. Network interface 756 may couple processors 720 to another computer system or to network 780. With network interface 756, processors 720 may receive or send information from or to network 780 in the course of performing steps of particular embodiments. Particular embodiments may execute solely on processors 720. Particular embodiments may execute on processors 720 and on one or more remote processors operating together.

In a network environment, where computer system 700 is connected to network 780, computer system 700 may communicate with other devices connected to network 780. Computer system 700 may communicate with network 780 via network interface 756. For example, computer system 700 may receive information (such as a request or a response from another device) from network 780 in the form of one or more incoming packets at network interface 756 and memory 730 may store the incoming packets for subsequent processing. Computer system 700 may send information (such as a request or a response to another device) to network 780 in the form of one or more outgoing packets from network interface 756, which memory 730 may store prior to being sent. Processors 720 may access an incoming or outgoing packet in memory 730 to process it, according to particular needs.

Computer system 700 may have one or more input devices 766 (which may include a keypad, keyboard, mouse, stylus, etc.), one or more output devices 768 (which may include one or more displays, one or more speakers, one or more printers, etc.), one or more storage devices 770, and one or more storage medium 752. An input device 766 may be external or internal to computer system 700. An output device 768 may be external or internal to computer system 700. A storage device 770 may be external or internal to computer system 700. A storage medium 752 may be external or internal to computer system 700.

Particular embodiments involve one or more computer-storage products that include one or more computer-readable storage media that embody software for performing one or more steps of one or more processes described or illustrated herein. In particular embodiments, one or more portions of the media, the software, or both may be designed and manufactured specifically to perform one or more steps of one or more processes described or illustrated herein. In addition or as an alternative, in particular embodiments, one or more portions of the media, the software, or both may be generally available without design or manufacture specific to processes described or illustrated herein. Example computer-readable storage media include, but are not limited to, CDs (such as CD-ROMs), FPGAs, floppy disks, floptical disks, hard disks, holographic storage devices, ICs (such as ASICs), magnetic tape, caches, PLDs, RAM devices, ROM devices, semiconductor memory devices, and other suitable computer-readable storage media. In particular embodiments, software may be machine code which a compiler may generate or one or more files containing higher-level code which a computer may execute using an interpreter.

As an example and not by way of limitation, memory 730 may include one or more computer-readable storage media embodying software and computer system 700 may provide particular functionality described or illustrated herein as a result of processors 720 executing the software. Memory 730 may store and processors 720 may execute the software. Memory 730 may read the software from the computer-readable storage media in mass storage device 730 embodying the software or from one or more other sources via network interface 756. When executing the software, processors 720 may perform one or more steps of one or more processes described or illustrated herein, which may include defining one or more data structures for storage in memory 730 and modifying one or more of the data structures as directed by one or more portions of the software, according to particular needs. In addition or as an alternative, computer system 700 may provide particular functionality described or illustrated herein as a result of logic hardwired or otherwise embodied in a circuit, which may operate in place of or together with software to perform one or more steps of one or more processes described or illustrated herein. The present disclosure encompasses any suitable combination of hardware and software, according to particular needs.

In particular embodiments, computer system 700 may include one or more Graphics Processing Units (GPUs) 724. In particular embodiments, GPU 724 may comprise one or more integrated circuits and/or processing cores that are directed to mathematical operations commonly used in graphics rendering. In some embodiments, the GPU 724 may use a special graphics unit instruction set, while in other implementations, the GPU may use a CPU-like (e.g. a modified x86) instruction set. Graphics processing unit 724 may implement a number of graphics primitive operations, such as blitting, texture mapping, pixel shading, frame buffering, and the like. In particular embodiments, GPU 724 may be a graphics accelerator, a General Purpose GPU (GPGPU), or any other suitable processing unit.

In particular embodiments, GPU 724 may be embodied in a graphics or display card that attaches to the hardware system architecture via a card slot. In other implementations, GPU 724 may be integrated on the motherboard of computer system architecture. Suitable graphics processing units may include Advanced Micro Devices® AMD R7XX based GPU devices (Radeon® HD 4XXX, AMD R8XX based GPU devices (Radeon® HD 7XXX, Intel® Larabee based GPU devices (yet to be released), nVidia® 8 series GPUs, nVidia® 9 series GPUs, nVidia® 100 series GPUs, nVidia® 200 series GPUs, and any other DX11-capable GPUs.

Although the present disclosure describes or illustrates particular operations as occurring in a particular order, the present disclosure contemplates any suitable operations occurring in any suitable order. Moreover, the present disclosure contemplates any suitable operations being repeated one or more times in any suitable order. Although the present disclosure describes or illustrates particular operations as occurring in sequence, the present disclosure contemplates any suitable operations occurring at substantially the same time, where appropriate. Any suitable operation or sequence of operations described or illustrated herein may be interrupted, suspended, or otherwise controlled by another process, such as an operating system or kernel, where appropriate. The acts can operate in an operating system environment or as stand-alone routines occupying all or a substantial part of the system processing.

The present disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend.

What is claimed is:

1. A method comprising:
   transmitting to a plurality of clients, by a computing system, common render assets comprising at least one viewport state data object (VSDO);
   transmitting, to each of the one or more clients, a unique spatial position different from other transmitted spatial positions, the unique spatial position representing a virtual position for generation of a respective render by a respective client of the plurality of clients;

transmitting, by the computing system, to each of the plurality of clients, one or more instructions to generate the respective render using the common render assets and its unique spatial position;

receiving, by the computing system, from each of the plurality of clients, the respective render for a portion of an entire environment, the environment comprising the common render assets;

generating, by the computing system, a composite render from the respective renders, each of the respective renders comprises the common render assets and each of the respective renders is rendered from one of the transmitted spatial positions; and transmitting, by the computing system, the composite render to the plurality of clients.

2. The method of claim 1, wherein each unique spatial position is generated randomly.

3. The method of claim 1, wherein the instructions to generate the respective render comprise instructions to perform path tracing on the common render assets from the unique spatial position.

4. The method of claim 3, wherein generating the composite render comprises adding the respective renders comprising light maps to generate a composite light map of the portion of the entire environment containing the common render assets.

5. The method of claim 3, wherein the respective render further comprises the render assets enhanced by diffuse lighting data calculated as a result of the path tracing.

6. The method of claim 3, wherein the respective render is a frame, and the one or more instructions include further comprises a common viewpoint from which to render the frame.

7. The method of claim 6, wherein generating the composite render comprises adding the rendered frames to generate a composite frame.

8. The method of claim 1, wherein the unique spatial position being based off a path tracing algorithm used to identify rays that have a high probability of striking a light source.

9. A method comprising:

receiving, from a server by a processor associated with a computing system, common render assets comprising at least one viewport state data object (VSDO) and a spatial position representing a virtual position for generation of a render;

receiving, from the server by the processor, one or more instructions to generate the render using the received common render assets and the spatial position;

generating, by the processor, the render from the spatial position for a portion of an entire environment comprising the common render assets in accordance with the one or more instructions;

transmitting, by the processor, the generated render to the server;

receiving, from the server by the processor, a composite render obtained from a plurality of renders rendered by a plurality of clients, each of the plurality of renders comprises the common render assets and each of the plurality of renders is rendered from a respective, unique virtual spatial position different from other virtual spatial positions of other renders and each of the plurality of renders comprises a portion of an environment comprising the common render assets.

10. The method of claim 9, further comprising:

rendering, by the processor, specular lighting from a server-independent viewpoint;

combining, by the processor, the rendered specular lighting with the received composite render; and outputting, by the processor, the combined rendered specular lighting and received composite render to a display.

11. An apparatus comprising:

a processor; and a non-transitory, computer-readable medium comprising program logic for execution by the processor, the program logic comprising:

common render asset transmission logic, executed by the processor, to transmit to a plurality of clients common render assets comprising at least one viewport state data object (VSDO);

spatial position transmission logic, executed by the processor to transmit, to each of the plurality of clients, a unique spatial position different from other transmitted spatial positions, the unique spatial position representing a virtual position for generation of a respective render by a respective client of the plurality of clients;

instruction transmission logic, executed by the processor, to transmit, to each of the plurality clients, one or more instructions to generate the respective render using the common render assets and its unique spatial position;

render receiving logic, executed by the processor, to receive, from each of the plurality clients, the respective render for a portion of an entire environment, the environment comprising the common render assets;

composite render generating logic, executed by the processor, to generate a composite render from the respective renders, each of the respective renders comprises the common render assets and is rendered from one of the transmitted spatial positions; and composite render transmitting logic, executed by the processor, to transmit the composite render to the plurality of clients.

12. The apparatus of claim 11, wherein each unique spatial position is generated randomly.

13. The apparatus of claim 11, wherein the unique spatial position represents a position for path tracing and the instructions to generate the respective render comprise instructions to perform path tracing on the common render assets from the unique spatial position.

14. The apparatus of claim 11, wherein the composite render generating logic further comprises logic for adding the respective renders comprising the portion of the entire environment containing the common render assets.

15. The apparatus of claim 13, wherein the composite render further comprises the common render assets enhanced by diffuse lighting data calculated as a result of the path tracing.

16. The apparatus of claim 11, wherein the composite render is a frame, and the one or more instructions include further comprises a common viewpoint from which to render the frame.

17. The apparatus of claim 16, generating the composite render comprising adding the rendered frames to generate a composite frame.

18. A non-transitory processor readable storage medium comprising instructions for execution by a processor, the instructions comprising instructions for:

transmitting to a plurality of clients, common render assets comprising a viewport state data object (VSDO);

transmitting, a unique spatial position different from other transmitted spatial positions, the unique spatial position representing a virtual position for generation of a respective render by a respective client of the plurality of clients;

transmitting, to each of the plurality clients, one or more instructions to generate the respective render using the common render assets and its unique spatial position;

receiving from each of the one or more clients, the respective render for a portion of an entire environment, the environment comprising the render assets;

generating a composite render from the respective renders, each of the respective renders comprises the common render assets and each of the respective renders is rendered from one of the transmitted spatial positions; and transmitting the composite render to the plurality of clients.

19. The processor readable medium of claim 18, wherein the composite render comprises a composite light map for the portion of an entire environment.

20. The processor readable medium of claim 19, further comprising instructions for:

generating the composite light map from light maps comprised in each of the respective renders.

* * * * *